(12) United States Patent
Mitsuda et al.

(10) Patent No.: US 11,929,649 B2
(45) Date of Patent: Mar. 12, 2024

(54) ROTATING ELECTRIC MACHINE WITH MAGNET INSERTION HOLE ARRANGEMENT

(71) Applicant: Mitsubishi Electric Corporation, Tokyo (JP)

(72) Inventors: Hiroshi Mitsuda, Tokyo (JP); Yoshihiro Miyama, Tokyo (JP); Masaya Inoue, Tokyo (JP); Masashi Nakamura, Tokyo (JP); Moriyuki Hazeyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 463 days.

(21) Appl. No.: 17/283,247

(22) PCT Filed: Jun. 28, 2019

(86) PCT No.: PCT/JP2019/025857
§ 371 (c)(1),
(2) Date: Apr. 7, 2021

(87) PCT Pub. No.: WO2020/090152
PCT Pub. Date: May 7, 2020

(65) Prior Publication Data
US 2021/0344241 A1 Nov. 4, 2021

(30) Foreign Application Priority Data
Oct. 30, 2018 (JP) ................. 2018-203896

(51) Int. Cl.
*H02K 1/276* (2022.01)
*H02K 21/14* (2006.01)

(52) U.S. Cl.
CPC ........... *H02K 1/2766* (2013.01); *H02K 21/14* (2013.01); *H02K 2213/03* (2013.01)

(58) Field of Classification Search
CPC .... H02K 1/276; H02K 1/2766; H02K 1/2773; H02K 2213/03
See application file for complete search history.

(56) References Cited

U.S. PATENT DOCUMENTS

2004/0150282 A1 8/2004 Murakami et al.
2017/0063187 A1* 3/2017 Hao ........................ H02K 21/14

FOREIGN PATENT DOCUMENTS

| JP | 2002-119027 A | 4/2002 |
|---|---|---|
| JP | 2004-104962 A | 4/2004 |

(Continued)

OTHER PUBLICATIONS

Beringer, Machine Translation of WO2019179862, Sep. 2019 (Year: 2019).*

(Continued)

*Primary Examiner* — Eric Johnson
(74) *Attorney, Agent, or Firm* — XSENSUS LLP

(57) ABSTRACT

The rotating electric machine includes: a rotor; and a stator, wherein the rotor includes: a rotor core having a magnet insertion hole group including a plurality of magnet insertion holes; and a permanent magnet group including a plurality of permanent magnets inserted in the plurality of magnet insertion holes of the magnet insertion hole group, respectively, wherein the plurality of magnet insertion holes are arranged side by side in a shape convex toward a center of the rotor from a radially-outer side surface of the rotor core, wherein the permanent magnet group forms one magnetic pole, wherein, in a part of the rotor core between the radially-outer side surface and the magnet insertion hole group, a magnetic slit is formed to extend in a shape convex toward the center of the rotor from the radially-outer side surface, and wherein the magnet insertion hole group includes three magnet insertion holes.

6 Claims, 12 Drawing Sheets

(56) References Cited

FOREIGN PATENT DOCUMENTS

| JP | 2007252018 A | * | 9/2007 |
| JP | 2008-187778 A | | 8/2008 |
| JP | 2015-186383 A | | 10/2015 |
| WO | WO-2019179862 A1 | * | 9/2019 |

OTHER PUBLICATIONS

Okuma, Machine Translation of JP2007252018, Sep. 2007 (Year: 2007).*
International Search Report and Written Opinion dated Sep. 3, 2019, received for PCT Application PCT/JP2019/025857, Filed on Jun. 28, 2019, 10 pages including English Translation.

* cited by examiner

ROTATING ELECTRIC MACHINE WITH MAGNET INSERTION HOLE ARRANGEMENT

CROSS-REFERENCE TO RELATED APPLICATIONS

The present application is based on PCT filing PCT/JP2019/025857, filed Jun. 28, 2019, which claims priority to JP 2018-203896, filed Oct. 30, 2018, the entire contents of each are incorporated herein by reference.

TECHNICAL FIELD

The present invention relates to a rotating electric machine in which permanent magnets are embedded in a rotor core.

BACKGROUND ART

Hitherto, there has been known a rotating electric machine including a stator and a rotor. The rotor is provided on an inner side with respect to the stator in a radial direction. The rotor includes a rotor core and pairs of permanent magnets. The rotor core has pairs of magnet insertion holes formed in an outer peripheral portion thereof, and the pairs of permanent magnets are inserted in the pairs of magnet insertion holes, respectively. Each pair of permanent magnets is arranged in a V-shape such that a distance between the pair of permanent magnets is increased in a circumferential direction toward an outer side in the radial direction. A magnetic slit is formed in a part of the stator core between the pair of permanent magnets. With this configuration, a d-axis inductance is reduced (see, for example, Patent Literature 1).

CITATION LIST

Patent Literature

[PTL 1] JP 2004-104962 A

SUMMARY OF INVENTION

Technical Problem

However, each pair of permanent magnets forms one magnetic pole. As a result, there has been a problem in that the torque of the rotating electric machine is reduced.

The present invention has been made to solve the above-mentioned problem, and has an object to provide a rotating electric machine with which torque can be increased.

Solution to Problem

According to the present invention, there is provided a rotating electric machine including: a rotor; and a stator provided on an outer side with respect to the rotor in a radial direction of the rotor, wherein the rotor includes: a rotor core having a magnet insertion hole group including a plurality of magnet insertion holes; and a permanent magnet group including a plurality of permanent magnets inserted in the plurality of magnet insertion holes of the magnet insertion hole group, respectively, wherein the plurality of magnet insertion holes of the magnet insertion hole group are arranged side by side in a shape convex toward a center of the rotor from a radially-outer side surface of the rotor core, wherein the permanent magnet group forms one magnetic pole, wherein, in a part of the rotor core between the radially-outer side surface of the rotor core and the magnet insertion hole group, a magnetic slit is formed to extend in a shape convex toward the center of the rotor from the radially-outer side surface of the rotor core, and wherein the magnet insertion hole group includes three or more magnet insertion holes.

Advantageous Effects of Invention

According to the rotating electric machine of the present invention, the magnet insertion hole group includes three or more magnet insertion holes. With this configuration, the torque of the rotating electric machine can be increased.

DESCRIPTION OF EMBODIMENTS

First Embodiment

Figure 1:
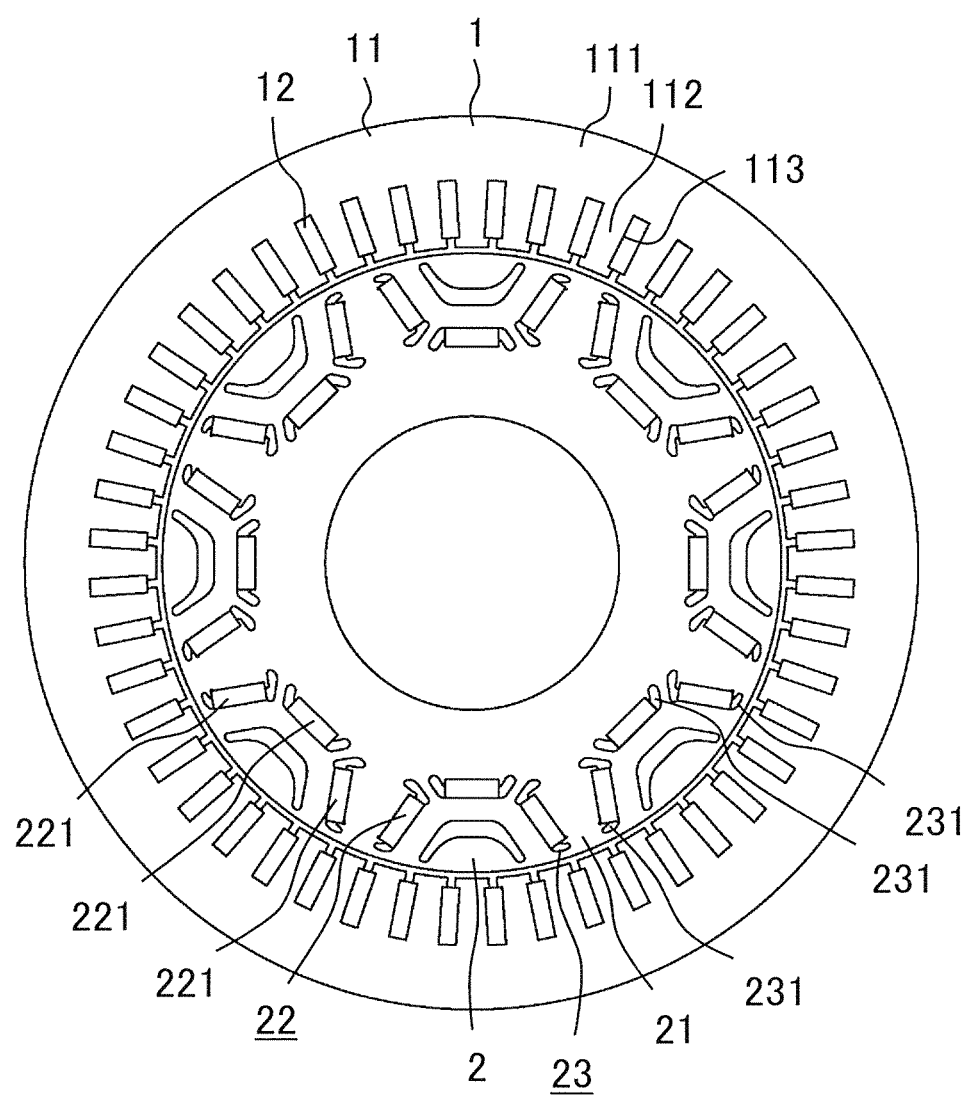
FIG. 1 is a plan view for illustrating a rotating electric machine according to a first embodiment of the present invention.

FIG. 1 is a plan view for illustrating a rotating electric machine according to a first embodiment of the present invention. The rotating electric machine according to the first embodiment includes a stator 1 and a rotor 2. The stator 1 is formed into an annular shape, and the rotor 2 is provided so as to be opposed to the stator 1. The stator 1 is provided on an outer side with respect to the rotor 2 in a radial direction of the rotor 2. In the following, a radial direction refers to a radial direction of the rotor 2, and a circumferential direction refers to a circumferential direction of the rotor 2. An axial direction refers to an axial direction of the rotor 2.

The stator 1 includes a stator core 11 and a plurality of coils 12. The plurality of coils 12 are provided on the stator core 11. The stator core 11 includes a core back 111 and a plurality of teeth 112. The core back 111 is formed into an annular shape, and the plurality of teeth 112 protrude inward in the radial direction from the core back 111. A distal end portion of each of the teeth 112 is opposed to the rotor 2. The plurality of teeth 112 are arranged side by side at equal intervals in the circumferential direction. A plurality of slots 113 are each formed between the teeth 112 adjacent to each other in the circumferential direction. The coils 12 are arranged in the slots 113.

The rotor 2 includes a rotor core 21 and a plurality of permanent magnet groups 22. The rotor core 21 has an annular shape, and the plurality of permanent magnet groups 22 are embedded in the rotor core 21. The rotor core 21 has a plurality of magnet insertion hole groups 23 formed at equal intervals in the circumferential direction.

Each of the magnet insertion hole groups 23 includes three magnet insertion holes 231. Each of the permanent magnet groups 22 includes three permanent magnets 221 respectively inserted into the three magnet insertion holes 231 of the magnet insertion hole group 23. Each permanent magnet group 22 forms one magnetic pole in the rotor 2.

Figure 2:
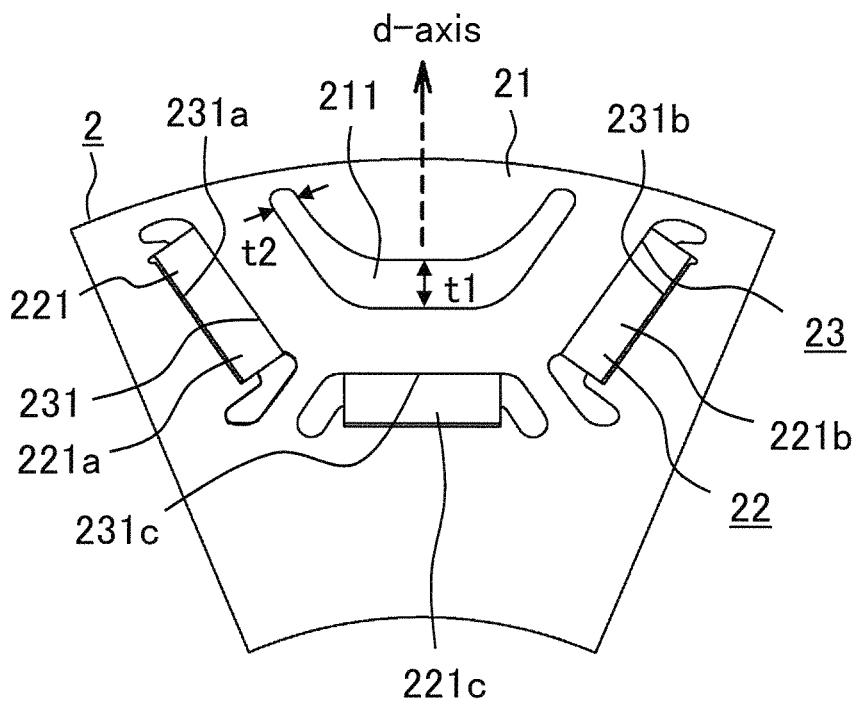
FIG. 2 is an enlarged view for illustrating a main part of a rotor of FIG. 1.

FIG. 2 is an enlarged view for illustrating a main part of the rotor 2 of FIG. 1. The magnet insertion holes of the magnet insertion hole group 23 are arranged side by side in a shape convex toward a center of the rotor 2 from a radially-outer side surface of the rotor core 21. In other words, when viewed in the axial direction, the magnet insertion holes of the magnet insertion hole group 23 are arranged side by side in one row in a U-shape in which an intermediate portion is arranged on a radially inner side with respect to both end portions.

In the magnet insertion hole group 23, two magnet insertion holes 231 among the three magnet insertion holes 231 are arranged such that, when viewed in the axial direction, a distance between the two magnet insertion holes 231 is increased toward the outer side in the radial direction. One of those two magnet insertion holes 231 is referred to as "first magnet insertion hole 231$a$", and the other thereof is referred to as "second magnet insertion hole 231$b$". The remaining one magnet insertion hole 231 among the three magnet insertion holes 231 in the magnet insertion hole group 23 is arranged between a radially-inner end portion of the first magnet insertion hole 231$a$ and a radially-inner end portion of the second magnet insertion hole 231$b$. This remaining one magnet insertion hole 231 is referred to as "third magnet insertion hole 231$c$".

The permanent magnet 221 inserted in the first magnet insertion hole 231$a$ is referred to as "first permanent magnet 221$a$". The permanent magnet 221 inserted in the second magnet insertion hole 231$b$ is referred to as "second permanent magnet 221$b$". The permanent magnet 221 inserted in the third magnet insertion hole 231$c$ is referred to as "third permanent magnet 221$c$".

In a part of the rotor core 21 between the radially-outer side surface of the rotor core 21 and the magnet insertion hole group 23, one magnetic slit 211 is formed to extend in a shape convex toward the center of the rotor 2 from the radially-outer side surface of the rotor core 21. In other words, in the part of the rotor core 21 between the radially-outer side surface of the rotor core 21 and the magnet insertion hole group 23, one magnetic slit 211 is formed to extend in a U-shape in which an intermediate portion is arranged on the radially inner side with respect to both end portions.

Figure 3:
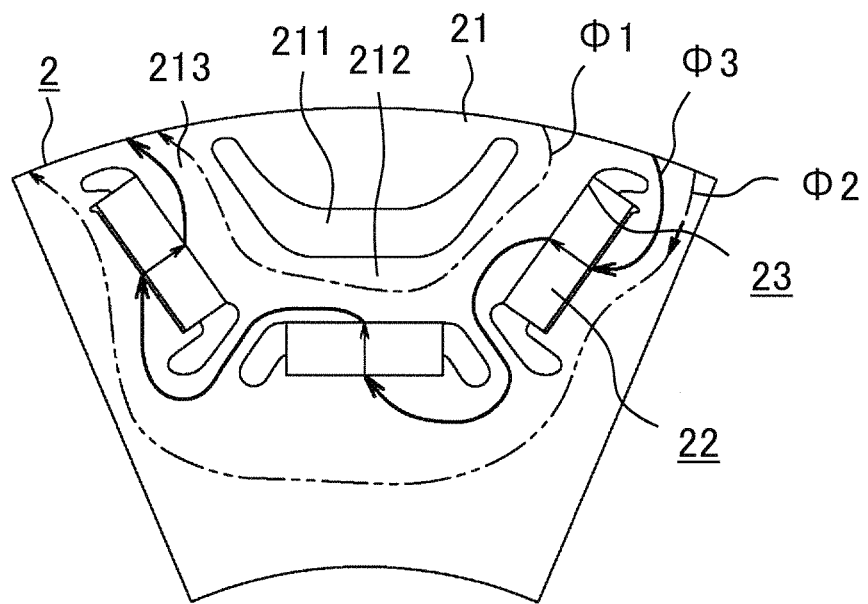
FIG. 3 is a view for illustrating paths through which magnetic fluxes pass in the main part of the rotor of FIG. 1.

FIG. 3 is a view for illustrating paths through which magnetic fluxes pass in the main part of the rotor 2 of FIG. 1. Through a part of the rotor core 21 between the magnet insertion hole group 23 and the magnetic slit 211, a first reluctance magnetic flux $\Phi 1$ passes. Through a part of the rotor core 21 on the radially inner side with respect to the magnet insertion hole group 23, a second reluctance magnetic flux $\Phi 2$ passes. Through both of the part of the rotor core 21 between the magnet insertion hole group 23 and the magnetic slit 211 and the part of the rotor core 21 on the radially inner side with respect to the magnet insertion hole group 23, a magnet magnetic flux $\Phi 3$ passes.

In the part of the rotor core 21 between the magnet insertion hole group 23 and the magnetic slit 211, a first q-axis magnetic path 212 is formed. Through a first q-axis magnetic path exit part 213 which is a radially outer part of the first q-axis magnetic path 212, the first reluctance magnetic flux $\Phi 1$ and the magnet magnetic flux $\Phi 3$ pass.

As illustrated in FIG. 2, a widthwise dimension of a part of the magnetic slit 211 adjacent to a center of the magnetic pole formed by the permanent magnet group 22 is represented by t1. A widthwise dimension of a part of the magnetic slit 211 adjacent to the first q-axis magnetic path exit part 213 is represented by t2. In this case, the following expression (1) is satisfied.

$$t1 > t2 \quad (1)$$

With this configuration, the magnet magnetic flux $\Phi 3$ passing through the third permanent magnet 221$c$ is prevented from leaking from the rotor core 21 in a d-axis direction. Therefore, magnetic saturation of the first q-axis magnetic path 212 through which the first reluctance magnetic flux $\Phi 1$ passes is suppressed.

Figure 4:
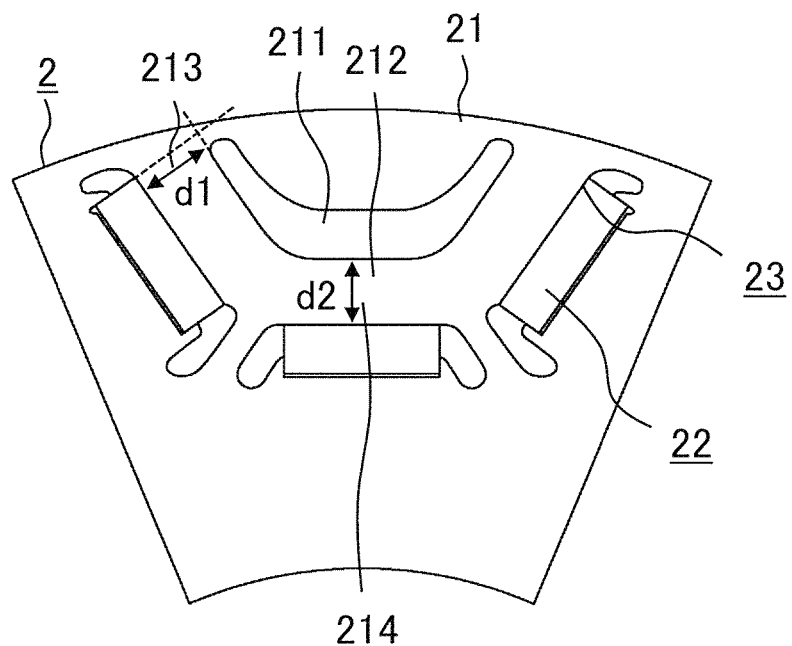
FIG. 4 is an enlarged view for illustrating the main part of the rotor of FIG. 1.

FIG. 4 is an enlarged view for illustrating the main part of the rotor 2 of FIG. 1. A widthwise dimension of the first q-axis magnetic path exit part 213 is represented by d1. A widthwise dimension of a first q-axis magnetic path center part 214 which is a part of the first q-axis magnetic path 212 adjacent to the center of the magnetic pole formed by the permanent magnet group 22 is represented by d2. In this case, the following expression (2) is satisfied.

$$d1 > d2 \quad (2)$$

The first q-axis magnetic path exit part 213 is a magnetic path through which both of the first reluctance magnetic flux $\varphi 1$ and the magnet magnetic flux $\varphi 3$ pass. Meanwhile, the first q-axis magnetic path center part 214 is a magnetic path through which only the first reluctance magnetic flux $\varphi 1$ passes. Therefore, when the above-mentioned expression (2) is satisfied, the magnetic saturation of the first q-axis magnetic path 212 is more averaged throughout the first q-axis magnetic path 212. As a result, the first q-axis magnetic path 212 can be effectively used.

As described above, according to the rotating electric machine of the first embodiment of the present invention, the magnet insertion hole group 23 includes three magnet insertion holes 231. Therefore, the permanent magnet group 22 includes three permanent magnets 221. With this configuration, the torque of the rotating electric machine can be increased as compared to the related-art rotating electric machine in which the permanent magnet group includes a pair of permanent magnets.

Further, this rotating electric machine satisfies t1>t2. In this manner, the magnet magnetic flux Φ3 passing through the third permanent magnet 221c can be prevented from leaking from the rotor core 21 in the d-axis direction. As a result, the magnetic saturation of the first q-axis magnetic path 212 through which the first reluctance magnetic flux Φ1 passes can be suppressed.

Further, this rotating electric machine satisfies d1>d2. In this manner, the magnetic saturation of the first q-axis magnetic path 212 can be more averaged throughout the first q-axis magnetic path 212. As a result, the first q-axis magnetic path 212 can be effectively used.

Figure 5:
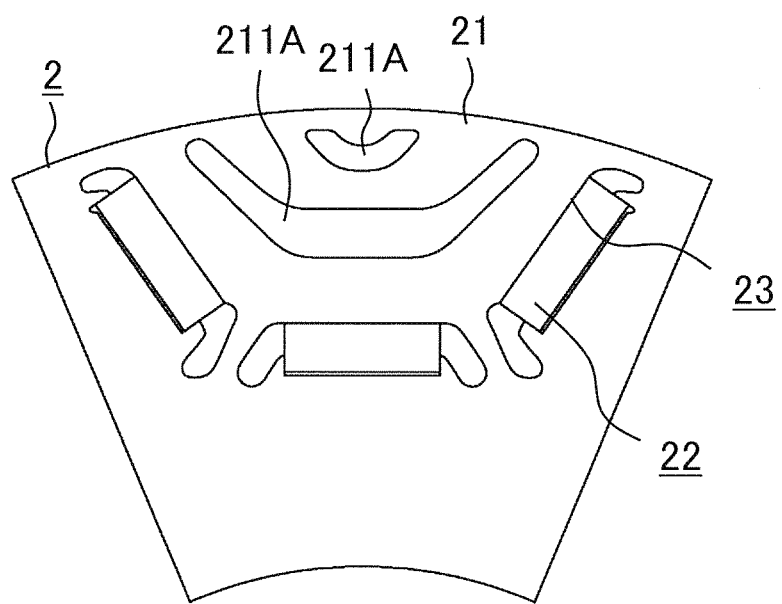
FIG. 5 is an enlarged view for illustrating a modification example of the main part of the rotor of FIG. 1.

FIG. 5 is an enlarged view for illustrating a modification example of the main part of the rotor 2 of FIG. 1. In the part of the rotor core 21 between the radially-outer side surface of the rotor core 21 and the magnet insertion hole group 23, two magnetic slits 211A may be formed to be arranged side by side and each extend in a shape convex toward the center of the rotor 2 from the radially-outer side surface of the rotor core 21. With this configuration, a part of the rotor core 21 between the plurality of magnetic slits 211A can be used as a magnetic path through which a reluctance magnetic flux passes.

Figure 6:
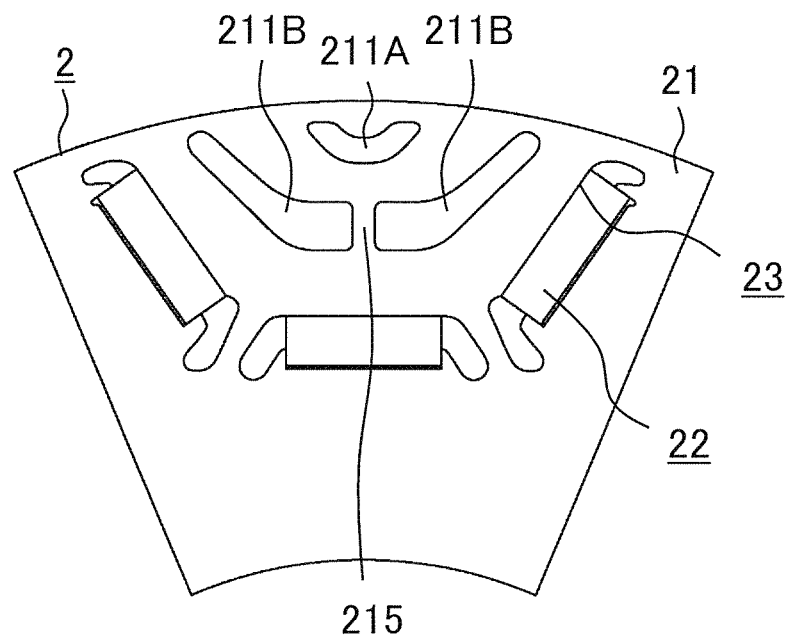
FIG. 6 is an enlarged view for illustrating a modification example of the rotor of FIG. 5.

FIG. 6 is an enlarged view for illustrating a modification example of the rotor 2 of FIG. 5. Of the two magnetic slits, a magnetic slit 211B arranged on the radially inner side may extend intermittently in a shape convex toward the center of the rotor 2 from the radially-outer side surface of the rotor core 21. In FIG. 6, two magnetic slits 211B are formed. In a part of the rotor core 21 between the two magnetic slits 211B, a rib 215 is formed. With this configuration, the rotating electric machine can be improved in strength against a centrifugal force.

Figure 7:
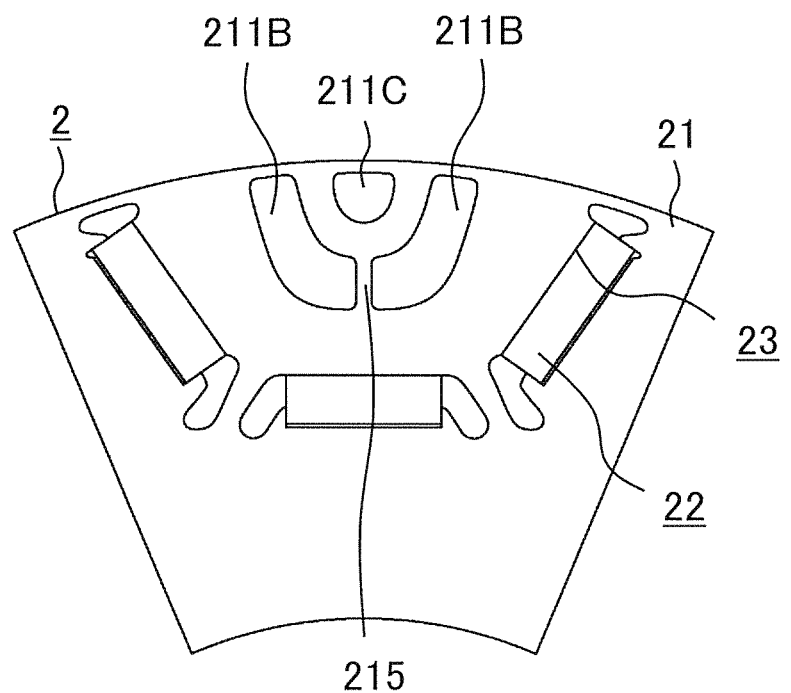
FIG. 7 is an enlarged view for illustrating a modification example of the rotor of FIG. 6.

FIG. 7 is an enlarged view for illustrating a modification example of the rotor 2 of FIG. 6. Of the two magnetic slits, a magnetic slit 211C arranged on the radially outer side is not required to extend in a convex shape beside the magnetic slit 211B. With this configuration, the mass of the rotor 2 can be reduced. As a result, the rotating electric machine can be improved in strength against a centrifugal force.

Figure 8:
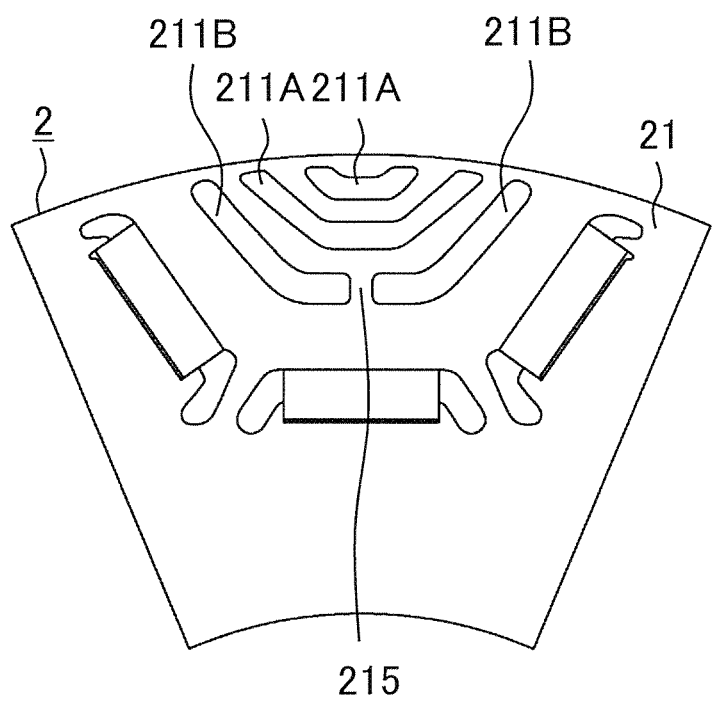
FIG. 8 is an enlarged view for illustrating a modification example of the rotor of FIG. 5.

FIG. 8 is an enlarged view for illustrating a modification example of the rotor 2 of FIG. 5. In a part of the rotor core 21 between the magnet insertion hole group 23 and a set of two magnetic slits 211A, a magnetic slit 211B may be formed to extend intermittently in a shape convex toward the center of the rotor 2 from the radially-outer side surface of the rotor core 21. With this configuration, a magnetic flux of a harmonic wave passing through the radially-outer side surface of the rotor 2 can be reduced.

Figure 9:
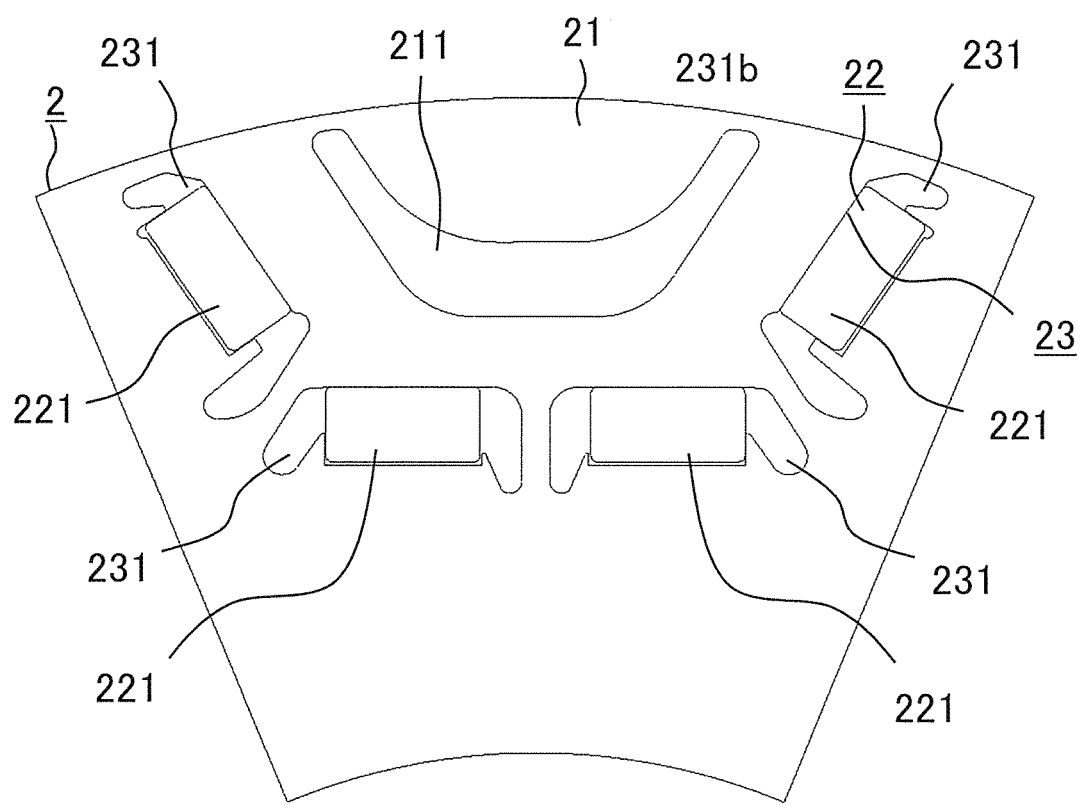
FIG. 9 is a plan view for illustrating the main part of the rotor when a magnet insertion hole group of FIG. 2 includes four magnet insertion holes.

In the above-mentioned first embodiment, description has been given of the configuration in which the magnet insertion hole group 23 includes three magnet insertion holes 231. However, the number of magnet insertion hole groups 23 is not limited to three, and is only required to be three or more. FIG. 9 is a plan view for illustrating the main part of the rotor 2 in a case in which the magnet insertion hole group 23 of FIG. 2 includes four magnet insertion holes 231. One permanent magnet 221 is inserted in each of the four magnet insertion holes 231.

Second Embodiment

Figure 10:
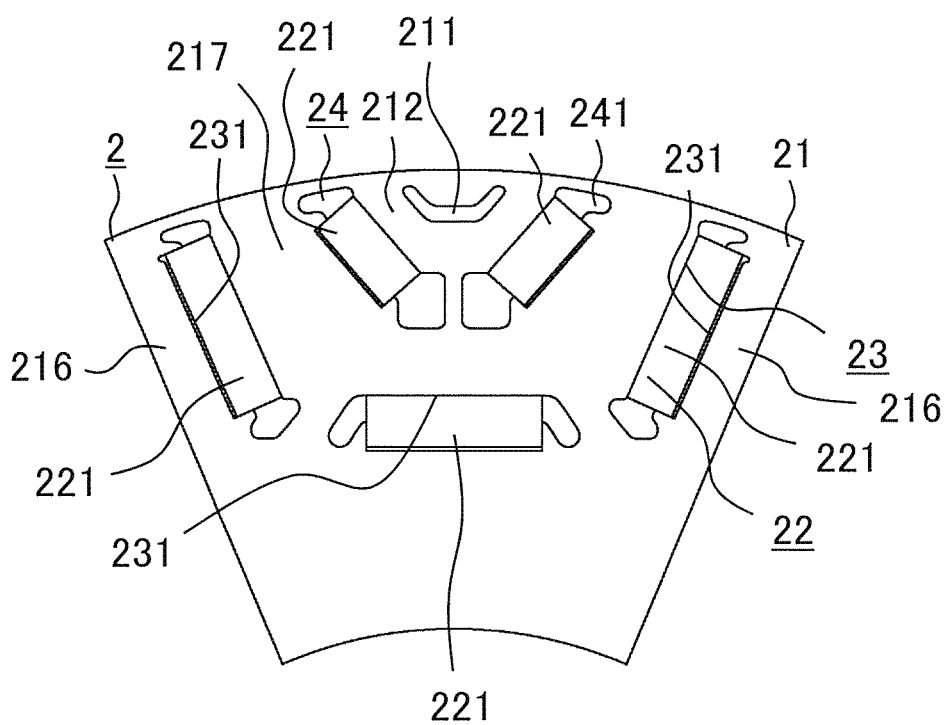
FIG. 10 is an enlarged view for illustrating a main part of a rotating electric machine according to a second embodiment of the present invention.

FIG. 10 is an enlarged view for illustrating a main part of a rotating electric machine according to a second embodiment of the present invention. In the part of the rotor core 21 between the magnet insertion hole group 23 and the magnetic slit 211, a magnet insertion hole group 24 is further formed. The magnet insertion hole group 24 includes a pair of magnet insertion holes 241. When viewed in the axial direction, the pair of magnet insertion holes 241 is formed into a V-shape such that a distance between the pair of magnet insertion holes 241 is increased toward the outer side in the radial direction. One permanent magnet 221 is inserted in each of the pair of magnet insertion holes 241.

In a part of the rotor core 21 between the magnet insertion hole group 24 and the magnetic slit 211, the first q-axis magnetic path 212 is formed. In a part of the rotor core 21 between the magnet insertion hole group 23 and another magnet insertion hole group (not shown) adjacent to the magnet insertion hole group 23 in the circumferential direction, a second q-axis magnetic path 216 is formed. In a part of the rotor core 21 between the magnet insertion hole group 23 and the magnet insertion hole group 24, a third q-axis magnetic path 217 is formed. Other configurations are similar to those in the first embodiment.

As described above, according to the rotating electric machine of the second embodiment of the present invention, the rotor core 21 has the magnet insertion hole group 23 and the magnet insertion hole group 24. The permanent magnet 221 is inserted in each of the magnet insertion holes 231 of the magnet insertion hole group 23 and the magnet insertion holes 241 of the magnet insertion hole group 24. With this configuration, the q-axis magnetic paths through which the reluctance magnetic fluxes pass can be ensured in the rotor core 21, and the magnet magnetic flux Φ3 can be increased.

Third Embodiment

Figure 11:
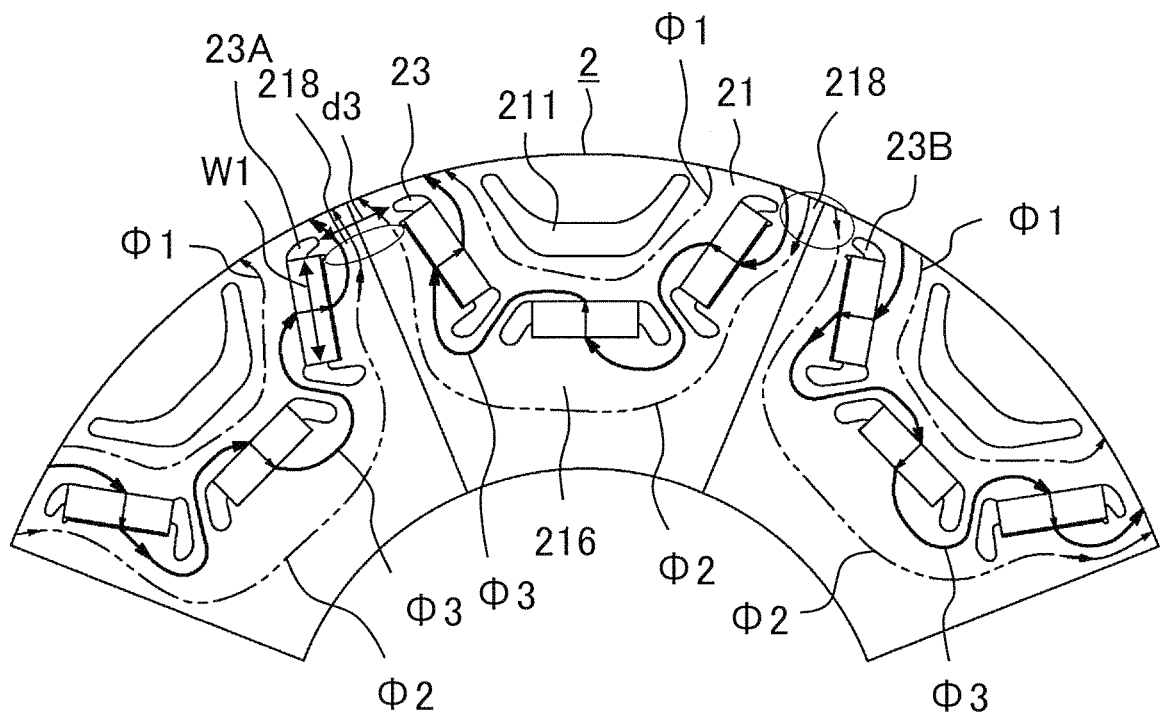
FIG. 11 is an enlarged view for illustrating a main part of a rotating electric machine according to a third embodiment of the present invention.

FIG. 11 is an enlarged view for illustrating a main part of a rotating electric machine according to a third embodiment of the present invention. Another magnet insertion hole group 23 adjacent to the magnet insertion hole group 23 on one side in the circumferential direction is referred to as "first adjacent magnet insertion hole group 23A". The other magnet insertion hole group 23 adjacent to the magnet insertion hole group 23 on the other side in the circumferential direction is referred to as "second adjacent magnet insertion hole group 23B".

In a part across a part of the rotor core 21 between the magnet insertion hole group 23 and the first adjacent magnet insertion hole group 23A, a part of the rotor core 21 on the radially inner side with respect to the magnet insertion hole group 23, and a part of the rotor core 21 between the magnet insertion hole group 23 and the second adjacent magnet insertion hole group 23B, the second q-axis magnetic path 216 is formed. Through a second q-axis magnetic path exit part 218 which is a radially outer part of the second q-axis magnetic path 216, two second reluctance magnetic fluxes Φ2 and one magnet magnetic flux Φ3 pass.

A widthwise dimension of the second q-axis magnetic path exit part 218 is represented by d3. A dimension of the permanent magnet 221 in a direction perpendicular to a magnetization direction of the permanent magnet 221 when viewed in the axial direction is represented by W1. A magnetic flux density of the permanent magnet 221 is represented by Bmag. A saturation magnetic flux density which is a magnetic flux density of the rotor core 21 when the magnetization of the rotor core 21 is saturated is represented by Bs. In this case, the following expression (3) is satisfied.

$$d3 > Bmag/Bs \times W1 \qquad (3)$$

In order to suppress the magnetic saturation in the second q-axis magnetic path exit part 218, it is at least required to prevent magnetic saturation by only the magnet magnetic flux Φ3. A total magnetic flux amount of the permanent magnet 221 is expressed by W1×Bmag. A magnetic flux density of the second q-axis magnetic path exit part 218 caused by the magnet magnetic flux Φ3 passing through the permanent magnet 221 is expressed by W1×Bmag/d3. This value is smaller than the saturation magnetic flux density Bs of the rotor core 21, and hence the above-mentioned expression (3) is obtained. With this configuration, the magnetic saturation in the second q-axis magnetic path exit part 218 is suppressed. Other configurations are similar to those in the first embodiment or the second embodiment.

As described above, according to the rotating electric machine of the third embodiment of the present invention, d3>Bmag/Bs×W1 is satisfied. With this configuration, the magnetic saturation in the second q-axis magnetic path exit part 218 can be suppressed.

Fourth Embodiment

Figure 12:
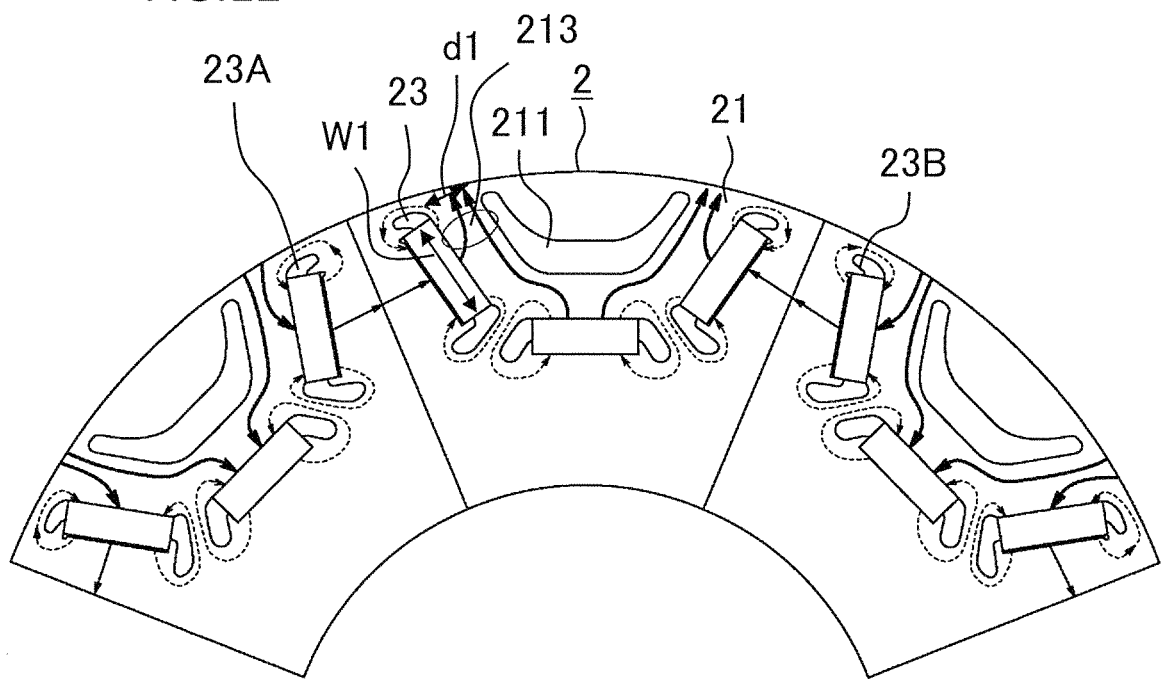
FIG. 12 is an enlarged view for illustrating a main part of a rotating electric machine according to a fourth embodiment of the present invention.

FIG. 12 is an enlarged view for illustrating a main part of a rotating electric machine according to a fourth embodiment of the present invention. Through the first q-axis magnetic path exit part 213, the magnet magnetic flux Φ3 passing through the first permanent magnet 221a and the magnet magnetic flux Φ3 passing through the second permanent magnet 221b pass.

Figure 13:
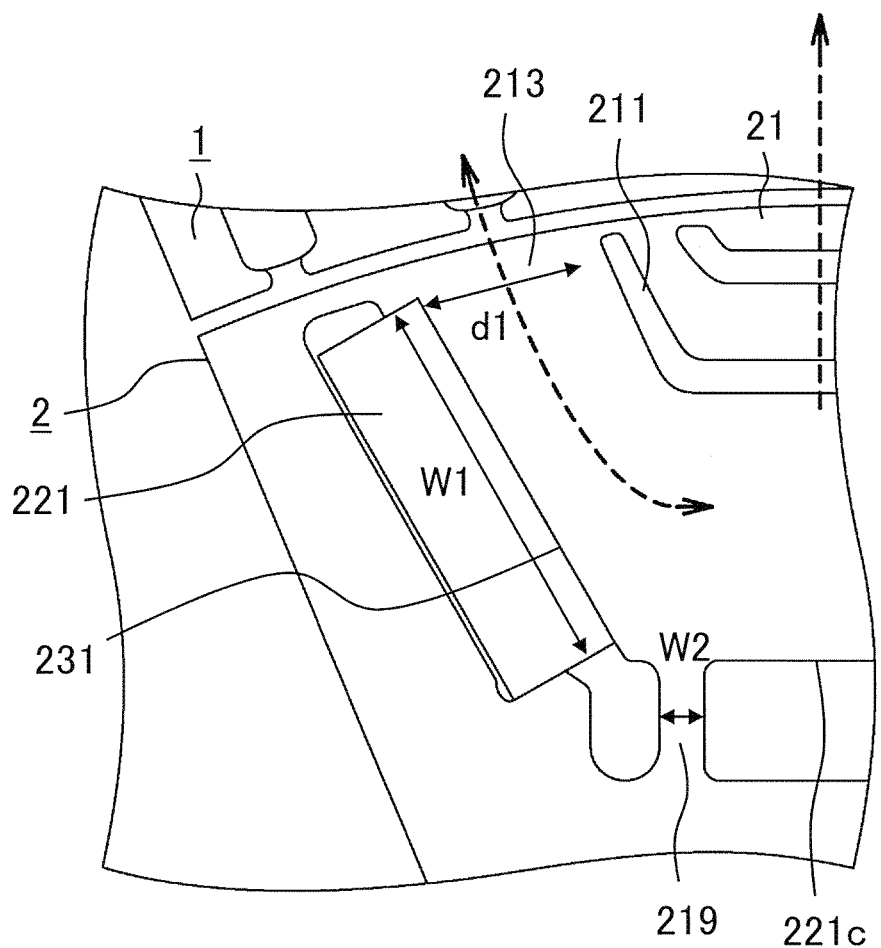
FIG. 13 is an enlarged view for illustrating the main part of the rotor of FIG. 12.

FIG. 13 is an enlarged view for illustrating the main part of the rotor 2 of FIG. 12. In a part of the rotor core 21 between the magnet insertion holes 231 adjacent to each other, an inter-magnet magnetic path 219 is formed. A widthwise dimension of the inter-magnet magnetic path 219 is represented by W2. A widthwise dimension of the first q-axis magnetic path exit part 213 is represented by d1. A dimension of the permanent magnet 221 in a direction perpendicular to a magnetization direction of the permanent magnet 221 when viewed in the axial direction is represented by W1. In this case, the following expression (4) is satisfied.

$$d1 > Bmag/Bs \times W1 - 0.5 \times W2 \qquad (4)$$

A total magnetic flux amount of the permanent magnet 221 is expressed by W1×Bmag. A leakage magnetic flux passing through the inter-magnet magnetic path 219 is expressed by W2×Bs. Therefore, a magnetic flux passing through the first q-axis magnetic path exit part 213 is expressed by W1×Bmag−0.5×W2×Bs. In this manner, the magnetic flux density in the first q-axis magnetic path exit part 213 is expressed by (W1×Bmag−0.5×W2×Bs)/d1. This value is smaller than the saturation magnetic flux density Bs of the rotor core 21, and hence the above-mentioned expression (4) is obtained. Other configurations are similar to those in any one of the first to third embodiments.

As described above, according to the rotating electric machine of the fourth embodiment of the present invention, d1>Bmag/Bs×W1−0.5×W2 is satisfied. With this configuration, the magnetic saturation in the first q-axis magnetic path exit part 213 is suppressed. Therefore, the reduction in q-axis inductance can be suppressed. In this manner, the q-axis inductance can be increased. As a result, the reluctance torque can be increased.

Fifth Embodiment

Figure 14:
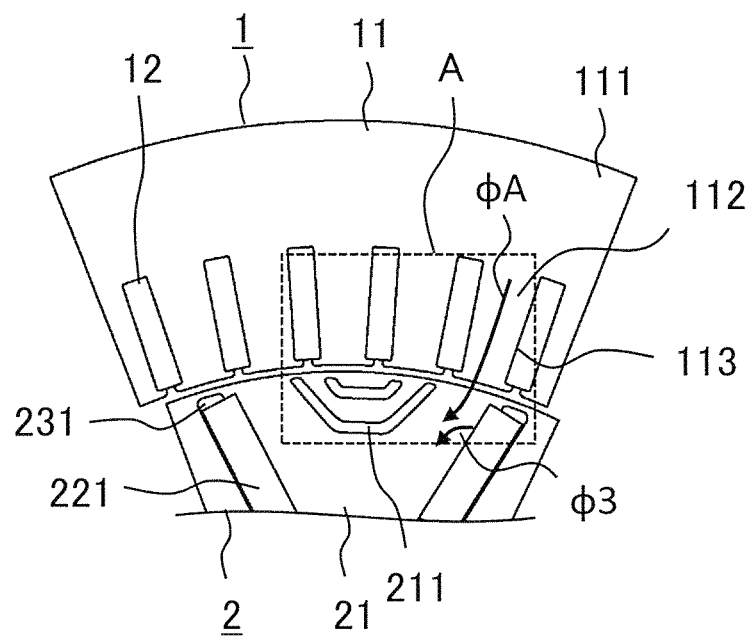
FIG. 14 is a plan view for illustrating a main part of a rotating electric machine according to a fifth embodiment of the present invention.
Figure 15:
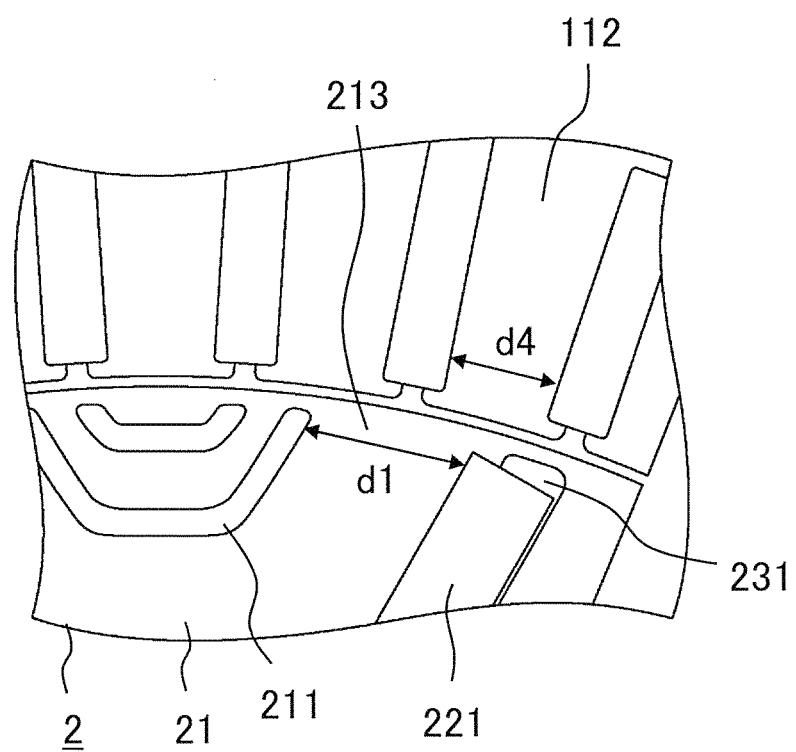
FIG. 15 is an enlarged view for illustrating a part A of FIG. 14.

FIG. 14 is a plan view for illustrating a main part of a rotating electric machine according to a fifth embodiment of the present invention. FIG. 15 is an enlarged view for illustrating a part A of FIG. 14. A widthwise dimension of the first q-axis magnetic path exit part 213 is represented by d1. A widthwise dimension of a part of the tooth 112 having the smallest widthwise dimension is represented by d4. In this case, the following expression (5) is satisfied.

$$d4 < d1 \qquad (5)$$

Other configurations are similar to those in any one of the first to fourth embodiments.

Figure 16:
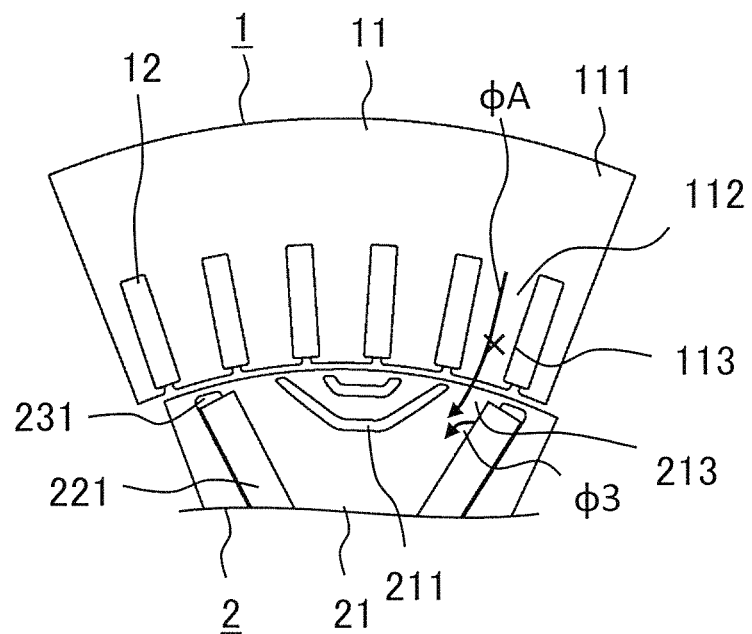
FIG. 16 is a view for illustrating a magnetic flux passing through a tooth in Comparative Example for comparison with the rotating electric machine according to the fifth embodiment.

In the rotating electric machine satisfying the above-mentioned expression (5), the magnetic saturation in the first q-axis magnetic path exit part 213 to be caused by an armature magnetic flux ΦA and the magnet magnetic flux Φ3 is suppressed. FIG. 16 is a view for illustrating a magnetic flux passing through the tooth 112 in Comparative Example for comparison with the rotating electric machine according to the fifth embodiment. In the rotating electric machine satisfying d4≥d1, the magnetic saturation is caused in the first q-axis magnetic path exit part 213 by the armature magnetic flux ΦA and the magnet magnetic flux Φ3. In this case, the magnetic resistance in the rotor core 21 is increased.

As described above, according to the rotating electric machine of the fifth embodiment of the present invention, d4<d1 is satisfied. With this configuration, the magnetic saturation in the first q-axis magnetic path exit part 213 to be caused by the armature magnetic flux ΦA and the magnet magnetic flux Φ3 can be suppressed. As a result, the increase in magnetic resistance of the rotor core 21 can be suppressed.

Sixth Embodiment

Figure 17:
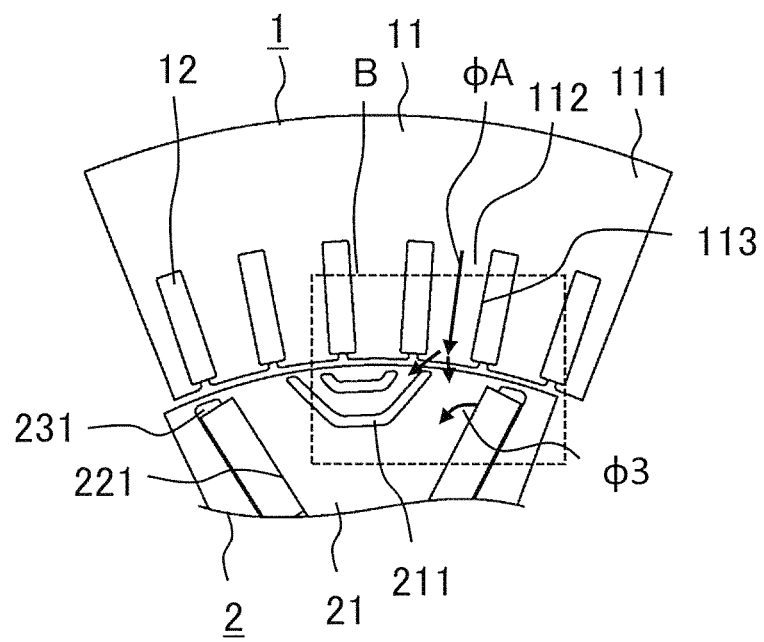
FIG. 17 is a plan view for illustrating a main part of a rotating electric machine according to a sixth embodiment of the present invention.
Figure 18:
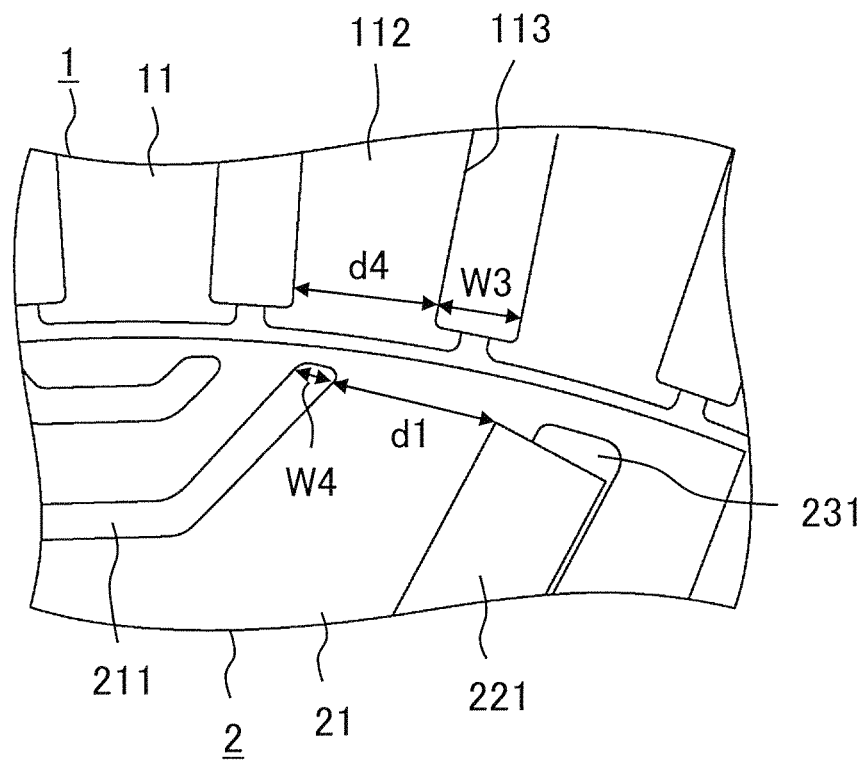
FIG. 18 is an enlarged view for illustrating a part B of FIG. 17.

FIG. 17 is a plan view for illustrating a main part of a rotating electric machine according to a sixth embodiment of the present invention. FIG. 18 is an enlarged view for illustrating a part B of FIG. 17. A widthwise dimension of a part of the tooth 112 having the smallest widthwise dimension is represented by d4. A widthwise dimension of a part of the slot 113 adjacent in the circumferential direction to the part of the tooth 112 having the smallest widthwise dimension is represented by W3. A length obtained by adding the dimension d4 and the dimension W3 corresponds to a length of one slot pitch.

A widthwise dimension of a part of the magnetic slit 211 adjacent to the first q-axis magnetic path exit part 213 in the circumferential direction is represented by W4. A widthwise dimension of the first q-axis magnetic path exit part 213 is represented by d1. In this case, the following expression (6) is satisfied.

$$d1 + W4 < d4 + W3 \qquad (6)$$

Other configurations are similar to those in any one of the first to fifth embodiments.

Figure 19:
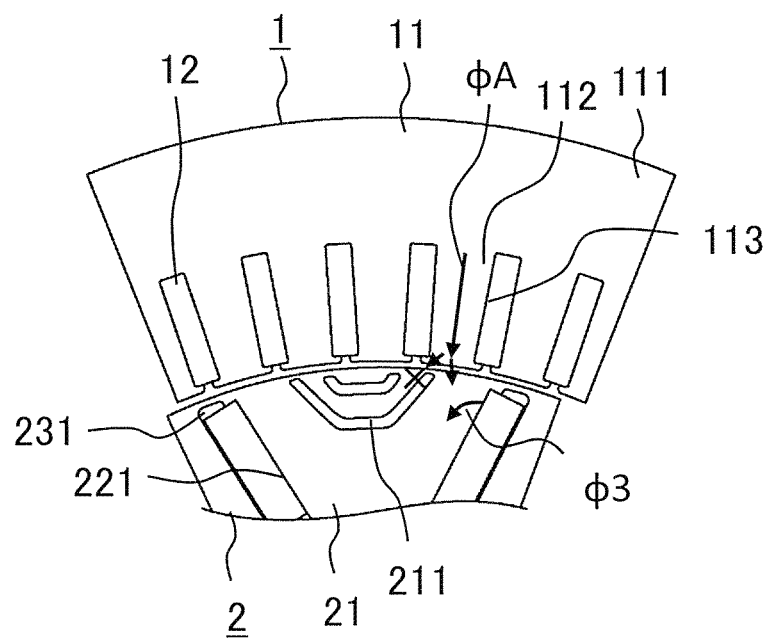
FIG. 19 is a view for illustrating a magnetic flux passing through a tooth in Comparative Example for comparison with the rotating electric machine according to the sixth embodiment.

FIG. 19 is a view for illustrating a magnetic flux passing through the tooth in Comparative Example for comparison with the rotating electric machine according to the sixth embodiment. In FIG. 19, a rotating electric machine satisfying d1+W4>d4+W3 is illustrated. In this case, the armature magnetic flux ΦA can pass only through a part of the rotor core 21 adjacent to the magnetic slit 211 on one side in the circumferential direction. In this case, the magnetic resistance in the rotor core 21 is reduced. Therefore, the reluctance torque of the rotating electric machine is reduced.

As described above, according to the rotating electric machine of the sixth embodiment of the present invention, d1+W4<d4+W3 is satisfied. With this configuration, the reduction in magnetic resistance in the rotor core 21 can be suppressed. As a result, the reduction in reluctance torque of the rotating electric machine can be suppressed.

REFERENCE SIGNS LIST 1 stator, 2 rotor, 11 stator core, 12 coil, 21 rotor core, 22 permanent magnet group, 23 magnet insertion hole group, 23A first adjacent magnet insertion hole group, 23B second adjacent magnet insertion hole group, 24 magnet insertion hole group, 111 core back, 112 teeth, 113 slot, 211, 211A, 211B, 211C magnetic slit, 212 first q-axis magnetic path, 213 first q-axis magnetic path exit part, 214 first q-axis magnetic path center part, 215 rib, 216 second q-axis magnetic path, 217 third q-axis magnetic path, 218 second q-axis magnetic path exit part, 219 inter-magnet magnetic path, 221 permanent magnet, 221a first permanent magnet, 221b second permanent magnet, 221c third permanent magnet, 231 magnet insertion hole, 231a first magnet insertion hole, 231b second magnet insertion hole, 231c third magnet insertion hole, 241 magnet insertion hole

The invention claimed is:

1. A rotating electric machine, comprising:
a rotor; and
a stator provided on an outer side with respect to the rotor in a radial direction of the rotor,
wherein the rotor includes:
a rotor core having a magnet insertion hole group including a plurality of magnet insertion holes; and
a permanent magnet group including a plurality of permanent magnets inserted in the plurality of magnet insertion holes of the magnet insertion hole group, respectively,
wherein the plurality of magnet insertion holes of the magnet insertion hole group are arranged side by side in a shape convex toward a center of the rotor from a radially-outer side surface of the rotor core,
wherein the permanent magnet group forms one magnetic pole,
wherein, in a part of the rotor core between the radially-outer side surface of the rotor core and the magnet insertion hole group, a magnetic slit is formed to extend in a shape convex toward the center of the rotor from the radially-outer side surface of the rotor core, and
wherein the magnet insertion hole group includes three or more magnet insertion holes,
the three or more magnet insertion holes in the magnet insertion hole group include at least first and second outer magnet insertion holes and a central insertion hole arranged between the first and second outer magnet insertion holes,
a first distance represents a shortest distance between the first outer magnet insertion hole and the slit,
a second distance represents a shortest distance between the central insertion hole and the slit, and
the first distance is greater than the second distance.

2. The rotating electric machine according to claim 1,
wherein, in a part of the rotor core between the magnet insertion hole group and the magnetic slit, a first q-axis magnetic path is formed, and
wherein the following expression is satisfied:

$$t1 > t2,$$

where t1 represents a widthwise dimension of a part of the magnetic slit adjacent to a center of the magnetic pole formed by the permanent magnet group, and t2 represents a widthwise dimension of a part of the magnetic slit adjacent to a first q-axis magnetic path exit part which is a radially outer part of the first q-axis magnetic path.

3. The rotating electric machine according to claim 1,
wherein, in a part of the rotor core between the magnet insertion hole group and the magnetic slit, a first q-axis magnetic path is formed, and
wherein the following expression is satisfied:

$$d1 > d2,$$

where d1 represents a widthwise dimension of a first q-axis magnetic path exit part which is a radially outer part of the first q-axis magnetic path between the slit and one of the plurality of permanent magnets, and d2 represents a widthwise dimension of a first q-axis magnetic path center part which is a part of the first q-axis magnetic path adjacent to a center of the magnetic pole formed by the permanent magnet group.

4. The rotating electric machine according to claim 1,
wherein, in a part across a part of the rotor core between the magnet insertion hole group and a first adjacent magnet insertion hole group which is another magnet insertion hole group adjacent to the magnet insertion hole group on one side in a circumferential direction, a part of the rotor core on a radially inner side with respect to the magnet insertion hole group, and a part of the rotor core between the magnet insertion hole group and a second adjacent magnet insertion hole group which is the other magnet insertion hole group adjacent to the magnet insertion hole group on the other side in the circumferential direction, a second q-axis magnetic path is formed, and
wherein the following expression is satisfied:

$$d3 > Bmag/Bs \times W1,$$

where d3 represents a widthwise dimension of a second q-axis magnetic path exit part which is a radially outer part of the second q-axis magnetic path, W1 represents a dimension of each of the plurality of permanent magnets in a direction perpendicular to a magnetization direction of each of the plurality of permanent magnets when viewed in an axial direction, Bmag represents a magnetic flux density of each of the plurality of permanent magnets, and Bs represents a saturation magnetic flux density of the rotor core.

5. The rotating electric machine according to claim 1,
wherein, in a part of the rotor core between the magnet insertion hole group and the magnetic slit, a first q-axis magnetic path is formed,
wherein, in a part of the rotor core between a pair of the magnet insertion holes adjacent to each other, an inter-magnet magnetic path is formed, and
wherein the following expression is satisfied:

$$d1 > Bmag/Bs \times W1 - 0.5 \times W2,$$

where d1 represents a widthwise dimension of a first q-axis magnetic path exit part which is a radially outer part of the first q-axis magnetic path, W1 represents a dimension of each of the plurality of permanent magnets in a direction perpendicular to a magnetization direction of each of the plurality of permanent magnets when viewed in an axial direction, W2 represents a widthwise dimension of the inter-magnet magnetic path, Bmag represents a magnetic flux density of each of the plurality of permanent magnets, and Bs represents a saturation magnetic flux density of the rotor core.

6. The rotating electric machine according to claim 1,
wherein, in a part of the rotor core between the magnet insertion hole group and the magnetic slit, a first q-axis magnetic path is formed,
wherein the stator includes a stator core including a plurality of teeth arranged side by side in the circumferential direction, the plurality of teeth each having a distal end portion opposed to the rotor, and
wherein the following expression is satisfied:

$$d4 < d1,$$

where d4 represents a widthwise dimension of each of the plurality of teeth, and d1 represents a widthwise dimension of a first q-axis magnetic path exit part which is a radially outer part of the first q-axis magnetic path.

* * * * *